(12) United States Patent
Yang

(10) Patent No.: US 11,618,362 B1
(45) Date of Patent: Apr. 4, 2023

(54) ADJUSTABLE VEHICLE-MOUNTED PILLOW DEVICE

(71) Applicant: Shenzhen Langpu Creative Advertising Co., Ltd., Shenzhen (CN)

(72) Inventor: Jun Yang, Shenzhen (CN)

(73) Assignee: Shenzhen Langpu Creative Advertising Co., Ltd., Shenzhen (CN)

( * ) Notice: Subject to any disclaimer, the term of this patent is extended or adjusted under 35 U.S.C. 154(b) by 0 days.

(21) Appl. No.: 17/647,454

(22) Filed: Jan. 8, 2022

(30) Foreign Application Priority Data

Dec. 1, 2021 (CN) .......................... 202122985319.2

(51) Int. Cl.
*B60N 3/00* (2006.01)
(52) U.S. Cl.
CPC ....................................... *B60N 3/00* (2013.01)
(58) Field of Classification Search
CPC .................................. B60N 3/00; B60N 2/882
USPC ................................ 296/1.07; 297/391, 397
See application file for complete search history.

(56) References Cited

U.S. PATENT DOCUMENTS

| 5,015,036 | A | * | 5/1991 | Fergie | A47C 7/383 |
| | | | | | 297/391 |
| 10,035,443 | B1 | * | 7/2018 | Sayed | B60N 2/879 |
| 11,225,180 | B2 | * | 1/2022 | Wang | B60N 2/882 |
| D964,781 | S | * | 9/2022 | Yang | D6/601 |

* cited by examiner

*Primary Examiner* — Paul N Dickson
*Assistant Examiner* — Sunsurraye Westbrook
(74) *Attorney, Agent, or Firm* — Jeenam Park

(57) ABSTRACT

An adjustable vehicle-mounted pillow device includes a pillow body, a slideway cavity on one side of the pillow body, a cover plate on an outer side of the slideway cavity, a fixing seat movably connected in the slideway cavity, a connection head clamped in the fixing seat, and a shaft body on one side of the connection head. Push the two sliders inward to squeeze a second spring and slide the fixing seat up and down and then release the sliders which would mesh with the respective corrugated slideways to thus adjusting the height. Press the button body inward to compress a first spring and the tooth pattern on the button body separates from the fixing tooth slot in the left half shaft thus adjusting the angle of the pillow body. The compressed spring will push the button body to make the tooth pattern snap into the fixing tooth slot.

10 Claims, 8 Drawing Sheets

ADJUSTABLE VEHICLE-MOUNTED PILLOW DEVICE

CROSS-REFERENCE TO RELATED APPLICATIONS

This application claims the benefit and priority of Chinese patent application No. 202122985319.2, filed on Dec. 1, 2021, disclosure of which is hereby incorporated by reference in its entirety.

TECHNICAL FIELD

This disclosure relates to the technical field of vehicle-mounted pillows, and more specifically relates to an adjustable vehicle-mounted pillow device.

BACKGROUND

Cars are used as a means of transportation in modern people's daily life and work. Since the car seat is not equipped with a neck pillow, it is easy for the riders to have neck soreness and discomfort during long-term driving. At present, there are some simple pillows on the market. In actual use, however, they don't provide a good effect and are very impractical.

SUMMARY

In order to overcome the above-mentioned shortcomings of the related art, the embodiments of the present disclosure provide an adjustable vehicle-mounted pillow device to solve the above-mentioned problems in the background art.

In order to achieve the above objectives, the present disclosure provides the following technical solutions. There is provided an adjustable vehicle-mounted pillow device, including a pillow main body, a slideway cavity, a corrugated slideway, a cover plate, a fixing seat, a clamping hole, and slider, a second spring, a connection head, a snap buckle, a shaft body, left half shaft, a right half shaft, a fixing tooth slot, a movable tooth slot, a clamp body, a main plate, a movable clamp arm, a hook, a recoil spring, a first unlock handle, a second unlock handle, a first spring one, a button body, and a tooth pattern. The slideway cavity is disposed on one side of the pillow body. The cover plate is disposed on the outer side of the slideway cavity. The fixing seat is movably connected to the slideway cavity. The connection head is snap-fitted with the fixing seat. The shaft body is disposed on one side of the connection head. The first spring and the button body are disposed inside the shaft body. The button body is disposed on one side of the first spring. The clamp body is disposed on one side of the shaft body. The coil spring is fixedly disposed on a side within the clamp body by screws, where the coil spring is mainly used for retracting and extending to adjust the front-to-back distance.

Corrugated slideways are provided on both sides in the slideway cavity.

A clamping hole is opened in the middle of the top of the fixing seat, and sliders are arranged on both sides of the fixing seat, and a second spring is connected to the bottom of each slider.

The upper surface of the connection head is provided with a snap buckle.

The shaft body includes a left half shaft and a right half shaft, the inside of the left half shaft is provided with a fixing tooth slot, and the inside of the right half shaft is provided with a movable tooth slot.

The outer surface of the button body is provided with a tooth pattern.

In an illustrative embodiment, the sliders and the corrugated slideways in the slideway cavity mesh with each other.

In an illustrative embodiment, the snap buckle on the connection head is matched and fitted with the hole in the fixing seat.

In an illustrative embodiment, the fixing seat and the sliders are connected by a second spring, the sliders are slidably connected to the fixing seat, and the upper surface of the sliders is provided with a protrusion.

In an illustrative embodiment, round holes are opened inside the left half shaft and the right half shaft, and the round holes are slidably connected to the button body.

In an illustrative embodiment, a linkage shaft is provided between the left half shaft and the right half shaft, wherein the left half shaft and the right half shaft are fixedly connected to the connection head, and a positioning hole is opened in the surface on a side of the left half shaft.

In an illustrative embodiment, the tooth pattern on the button body meshes with the fixing tooth slot and the movable tooth slot.

In an illustrative embodiment, the clamp body includes a main plate, one side of the main plate is provided with a movable clamp arm, the other side of the main plate is provided with a fixed clamp arm, and the side surface of the main plate is provided with a hook. A first unlock handle is provided on one side of the upper surface of the main plate, and a second unlock handle is provided on the other side of the upper surface of the main plate. A coil spring is fixed inside the main plate. The main board includes an upper and a lower plate.

In an illustrative embodiment, both the side surfaces of the first unlock handle and the second unlock handle are each provided with a return spring.

In an illustrative embodiment, a mounting groove is formed inside the pillow body, and the mounting groove is matched with the slideway cavity, and the slideway cavity and the cover plate are fixedly connected by bolts.

Technical effects and advantages of the disclosure are as follows.

This device is assembled by a pillow body, a slideway cavity, a cover plate, a fixing seat, a connection head, a shaft body, and a clamp body. Push the two sliders inward to squeeze the second spring and so the fixing seat can slide up and down in the slideway cavity, and the sliders mesh with the corrugated slideways in the slideway cavity to realize the function of adjusting the height of the pillow body by sliding up and down. Press the button body inward to compress the spring one so that the tooth pattern on the button body separates from the fixing tooth slot in the left half shaft, so that the angle of the pillow body can be adjusted, making it more comfortable to use. Release the button body so that the compressed spring will push the button body, and the tooth pattern on the button body will be locked into the fixing tooth slot, so as to realize the function of fixing the angle. The coil spring is fixed on one side in the main plate, and the coil spring automatically retracts after being stretched, so as to adjust the distance between the front and back of the pillow body.

Figure 1:
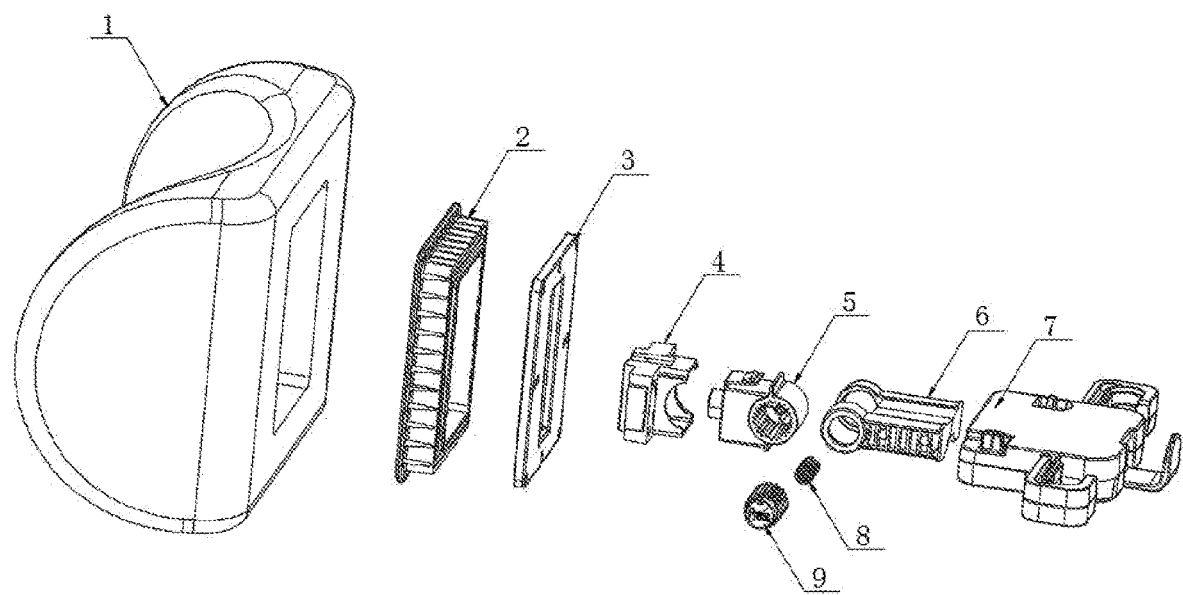
FIG. 1 is an exploded view illustrating the overall structure of the present disclosure.

Reference signs in the drawings: 1 pillow body, 2 slideway cavity, 21 corrugated slideway, 3 cover plate, 4 fixing seat, 41 clamping hole, 42 slider, 43 second spring, 5 connection head, 51 snap buckle, 6 shaft body, 61 left half shaft, 62 right half shaft, 63 fixing tooth slot, 64 movable tooth slot, 65 positioning hole, 7 clamp body, 71 main plate, 72 movable clamp arm, 73 hook, 74 first unlock handle, 75 second unlock handle, 76 fixed clamp arm, 8 first spring, 9 button body, 91 tooth pattern, 10 coil spring.

DETAILED DESCRIPTION OF ILLUSTRATIVE EMBODIMENTS

Hereinafter, technical solutions in the embodiments according to the present disclosure will be described in a definite and comprehensive manner in connection with the accompanying drawings in the embodiments according to the present disclosure. Apparently, the embodiments described herein are only a part, rather than all of the embodiments in accordance with the present disclosure. Based on the embodiments of the present disclosure, all other embodiments obtained by those having ordinary skill in the art without investing creative efforts shall all fall in the scope of protection of the present disclosure.

Figure 2:
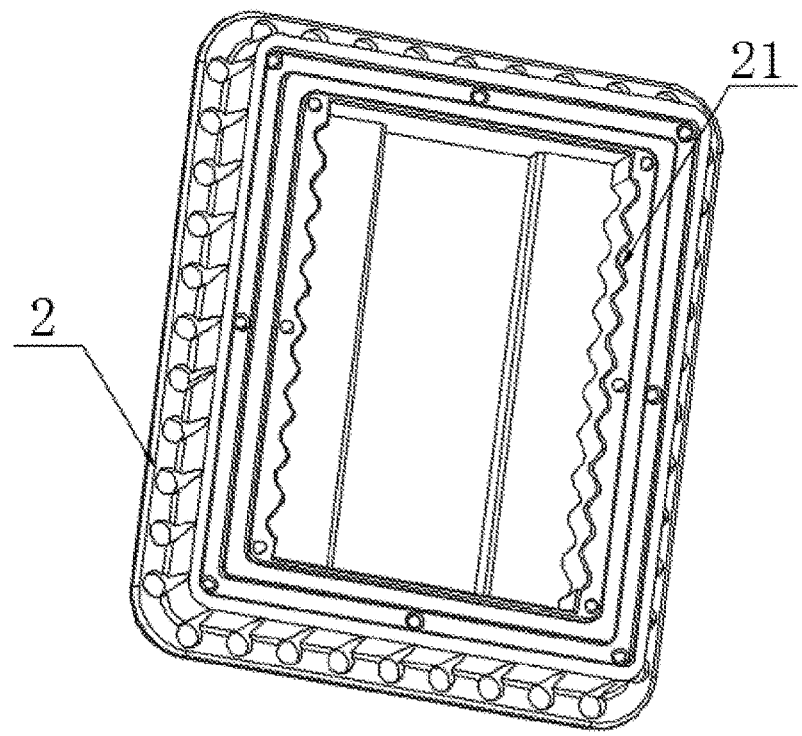
FIG. 2 is a schematic diagram illustrating the structure of a slideway cavity of the present disclosure.
Figure 3:
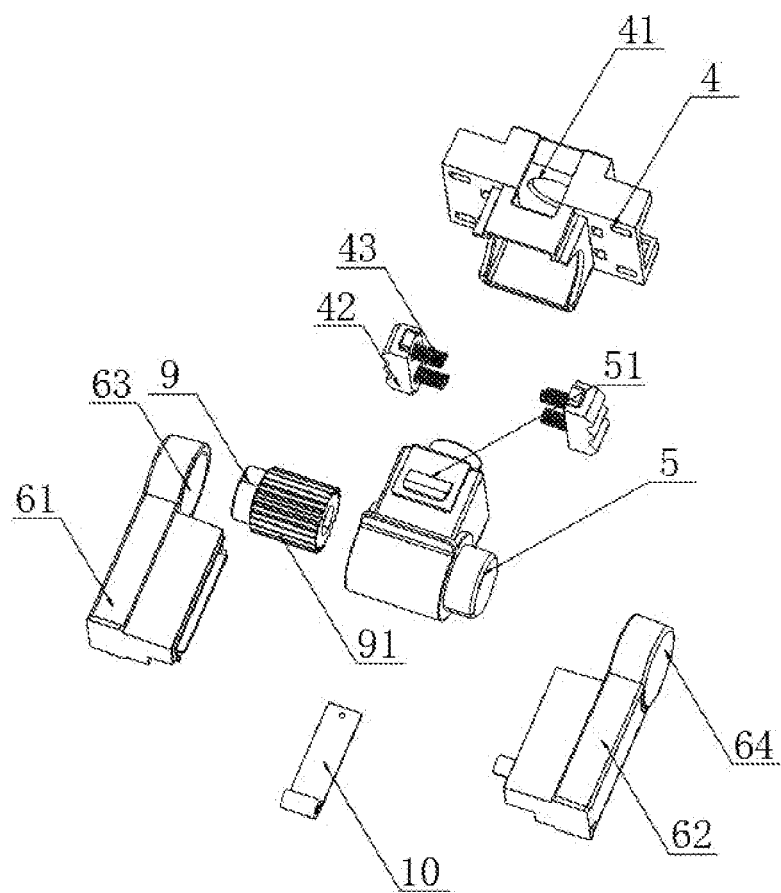
FIG. 3 is a schematic diagram illustrating the structure of the fixing seat, a connection head and a shaft body in the present disclosure.
Figure 4:
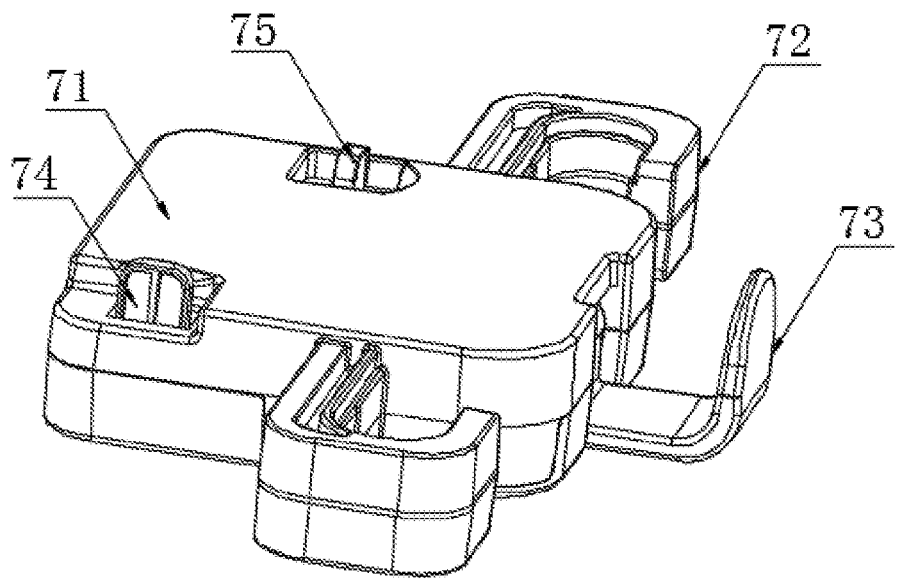
FIG. 4 is a schematic diagram illustrating the structure of the clamp main body in the present disclosure.
Figure 5:
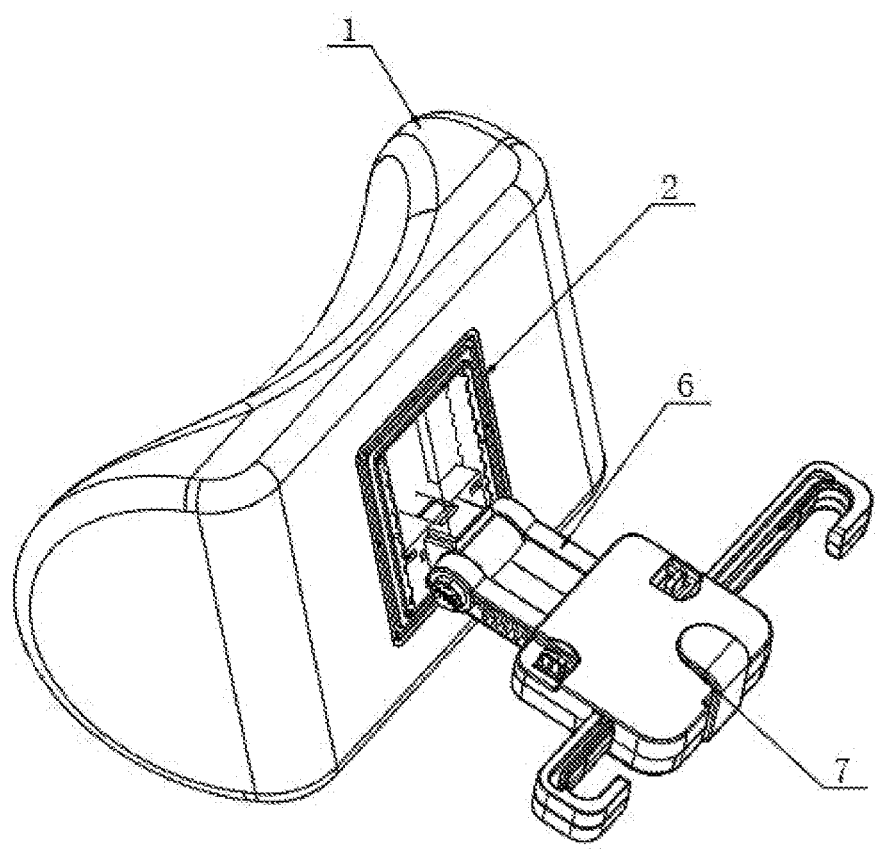
FIG. 5 is a schematic diagram illustrating the overall structure of the present disclosure.
Figure 6:
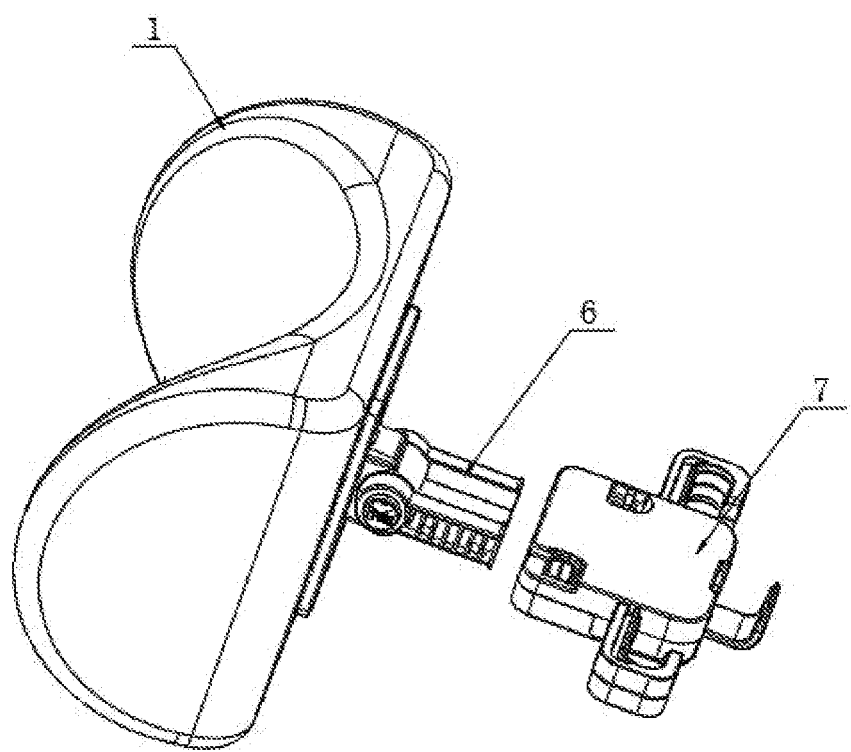
FIG. 6 is a schematic diagram illustrating the structure where the shaft body is separated from the clamp body according to the present disclosure.
Figure 7:
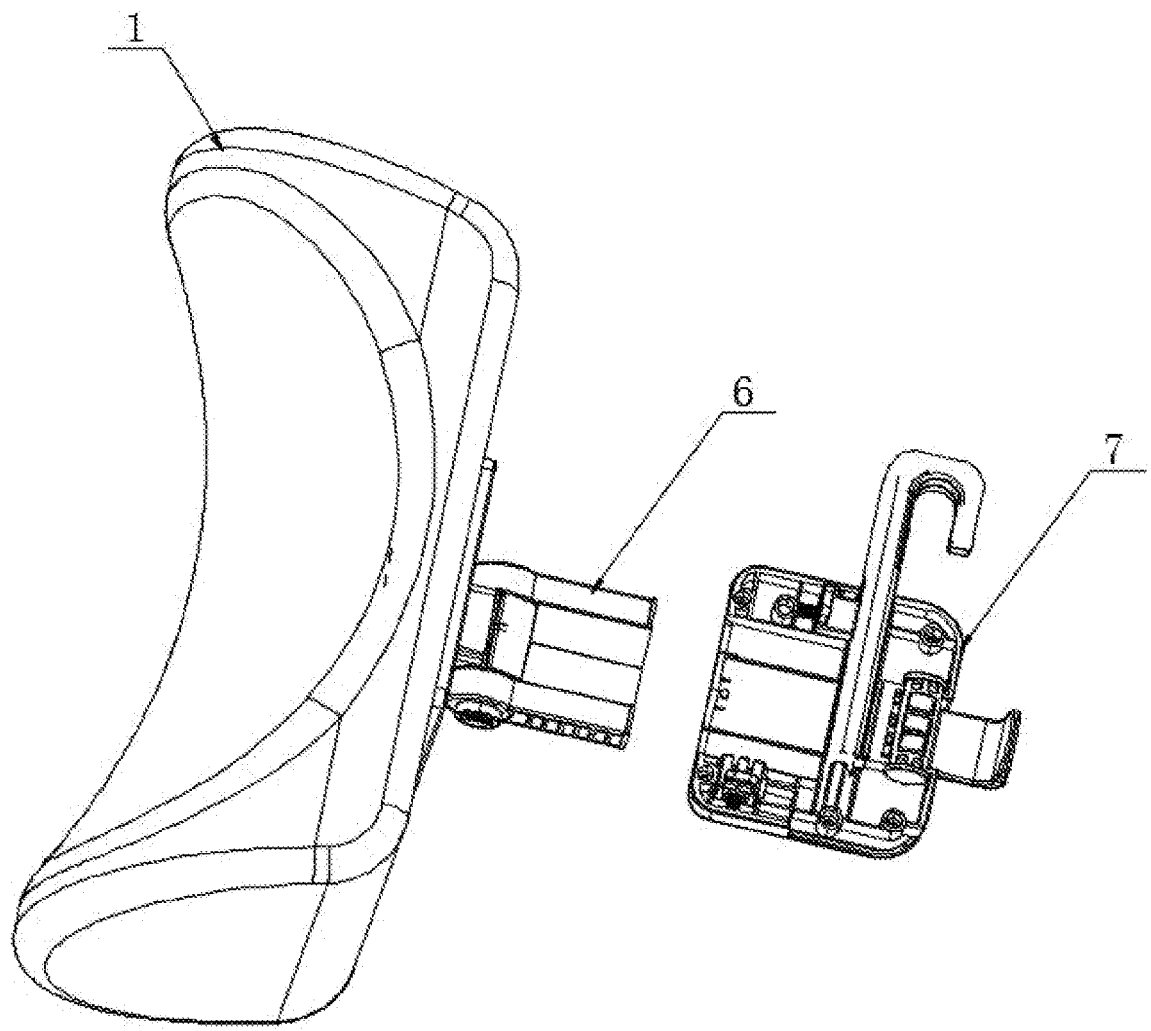
FIG. 7 is a schematic diagram illustrating the structure where the clamp body is separated according to the present disclosure.
Figure 8:
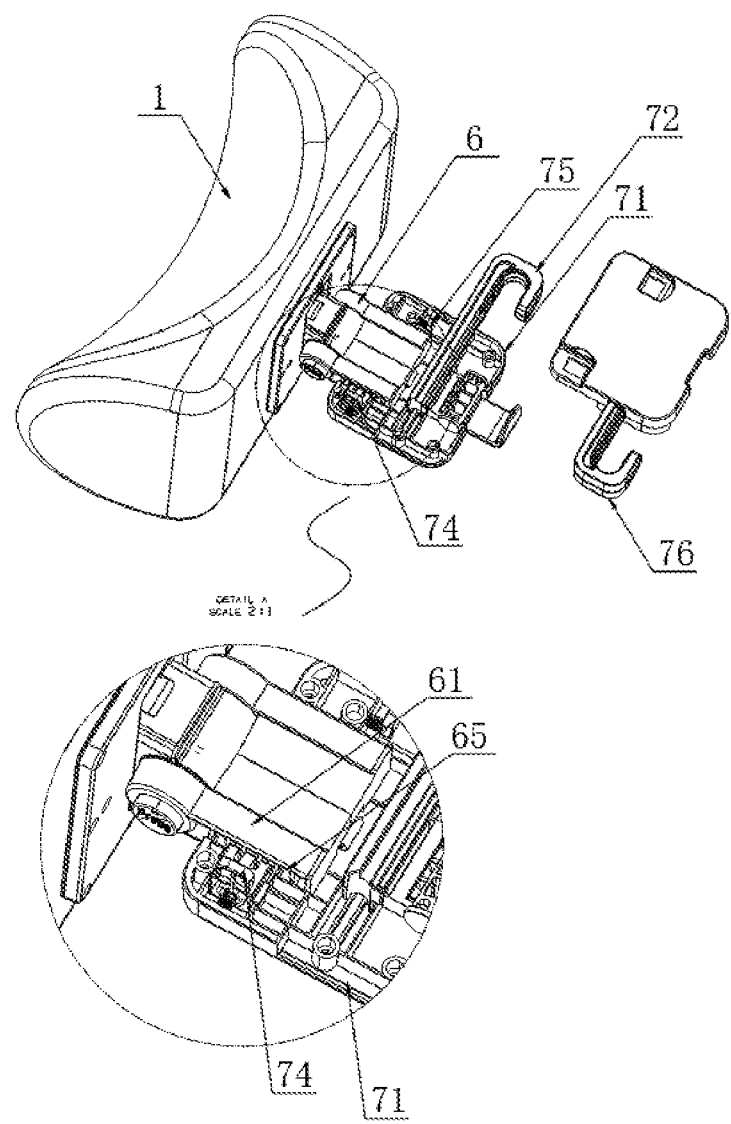
FIG. 8 is a schematic diagram illustrating the structure of the clamp main body where the main plate is separated according to the present utility mode.
Figure 9:
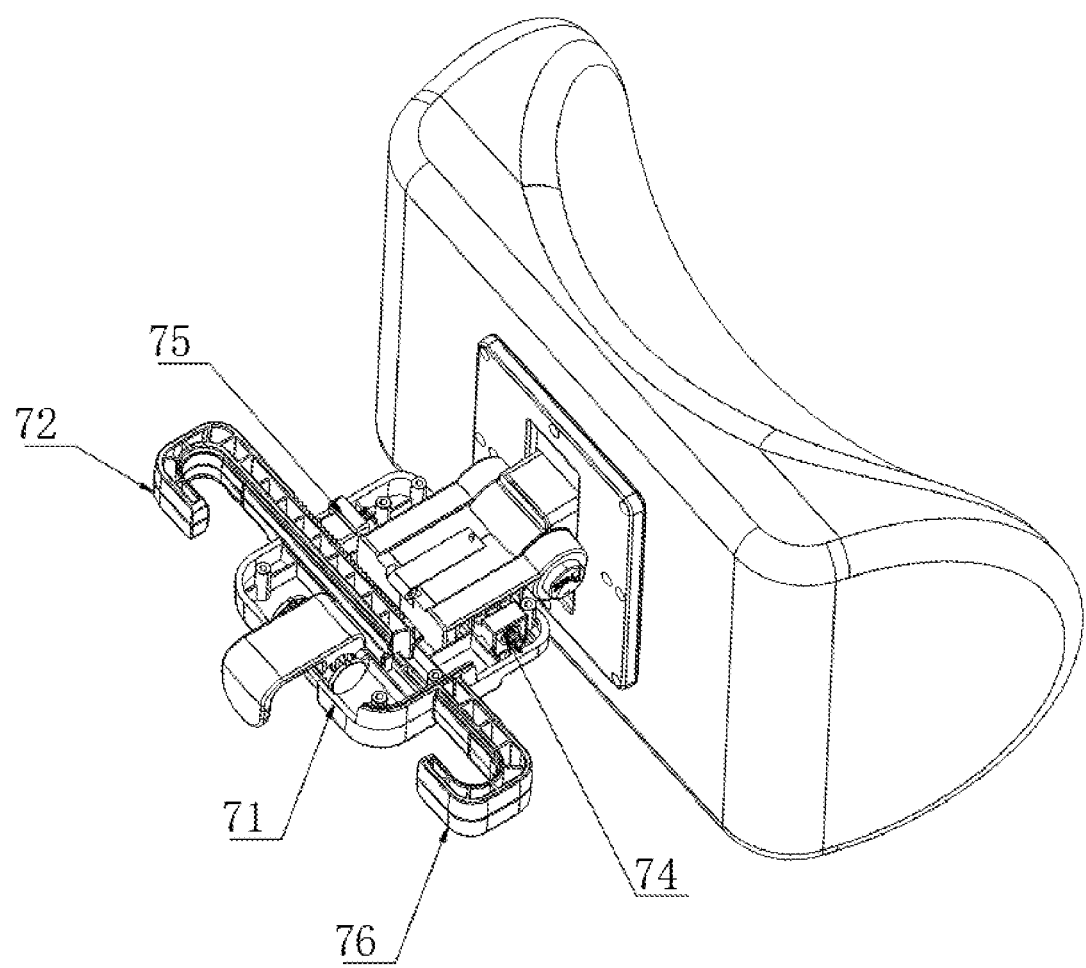
FIG. 9 is a schematic diagram illustrating the structure of the clamp main body according to the present disclosure.
Figure 10:
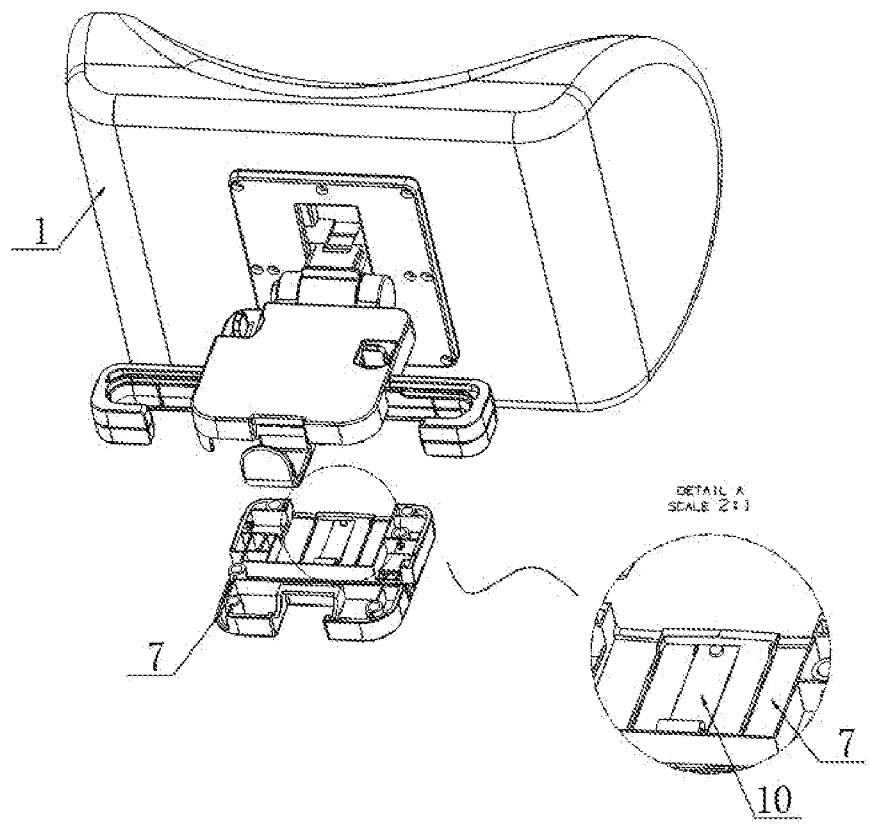
FIG. 10 is a schematic diagram illustrating the installation and structure of the coil spring according to the present disclosure.

As illustrated in FIGS. 1 to 10, an adjustable vehicle-mounted pillow device includes a pillow main body 1, a slideway cavity 2, a corrugated slideway 21, a cover plate 3, a fixing seat 4, a clamping hole 41, and slider 42, a second spring 43, a connection head 5, a snap buckle 51, a shaft body 6, left half shaft 61, a right half shaft 62, a fixing tooth slot 63, a movable tooth slot 64, a clamp body 7, a main plate 71, a movable clamp arm 72, a hook 73, a first unlock handle 74, a second unlock handle 75, a first spring one 8, a button body 9, and a tooth pattern 91. The slideway cavity 2 is disposed on one side of the pillow body 1. The cover plate 3 is disposed on the outer side of the slideway cavity 2. The fixing seat 4 is movably connected to the slideway cavity 2. The connection head 5 is snap-fitted with the fixing seat 4. The shaft body 6 is disposed on one side of the connection head 5. The first spring 8 and the button body 9 are disposed inside the shaft body 6. The button body 9 is disposed on one side of the first spring 8. The clamp body 7 is disposed on one side of the shaft body 6. A coil spring 10 is fixedly disposed on a side within the clamp body 7 by screws, where the coil spring 10 is mainly used for retracting and extending to adjust the front-to-back distance.

Corrugated slideways 21 are provided on both sides in the slideway cavity 2.

A clamping hole 41 is opened in the middle of the top of the fixing seat 4, and sliders 42 are arranged on both sides of the fixing seat 4, and a second spring 43 is connected to the bottom of each slider 42.

The upper surface of the connection head 5 is provided with a snap buckle 51.

The shaft body 6 includes a left half shaft 61 and a right half shaft 62, the inside of the left half shaft 61 is provided with a fixing tooth slot 63, and the inside of the right half shaft 62 is provided with a movable tooth slot 64.

The outer surface of the button body 9 is provided with a tooth pattern 91.

In some embodiments, the slider 42 and the corrugated slideway 21 in the slideway cavity 2 mesh with each other. The snap buckle 51 on the connection head 5 is fitted with the clamping hole 41 in the fixing seat 4. The fixing seat 4 and the slider 42 are connected by the second spring 43, the slider 42 is slidably connected to the fixing seat 4, and the upper surface of the slider 42 is provided with a protrusion. The inside of the left half shaft 61 and the right half shaft 62 is provided with a circular hole, the circular hole is slidably connected to the button body 9. A linkage shaft is provided between the left half shaft 61 and the right half shaft 62, wherein the left half shaft 61 and the right half shaft 62 are fixedly connected to the connection head 5, and the left half shaft 61 is provided with a positioning hole 65 in the surface on the side. The tooth pattern 91 on the button body 9 meshes with the fixing tooth slot 63 and the movable tooth slot 64. The clamp body 7 includes a main plate 71, one side of the main plate 71 is provided with a movable clamp arm 72, the other side of the main plate 71 is provided with a fixed clamp arm 76, and the side surface of the main plate 71 is provided with a hook 73. The upper surface of the main plate 71 is provided with a first unlock handle 74. The other side of the upper surface of the main plate 71 is provided with a second unlock handle 75, where the main plate 71 includes an upper and a lower plate. The side surface of each of the first unlock handle 74 and the second unlock handle 75 is provided with a return spring, so that when the unlock handle 74 is inserted into the positioning hole 65 on the left half shaft 61, and the coil spring 10 is stretched and contracted to adjust the distance between the shaft body 6 and the clamp body 7. The pillow body 1 is provided with a mounting groove in the interior, and the mounting groove is fitted with the slideway cavity 2, where the slideway cavity 2 and the cover plate 3 are fixedly connected by bolts.

The working principle of the disclosure is as follows.

The device is assembled by the pillow body 1, the slideway cavity 2, the cover plate 3, the fixing seat 4, the connection head 5, the shaft body 6, and the clamp body 7. Push the two sliders 42 inward, the sliders 42 will squeeze the second sliders 43, and the fixing seat 4 will be able to slide up and down in the slideway cavity 2. When sliding to a proper position, release the sliders 42, the compressed second springs 43 will squeeze the sliders 42, which would mesh with the corrugated slideways 21 in the slideway cavity 2, thereby completing the up and down sliding adjustment of the height of the pillow body 1.

Press the button body 9 inward to compress the spring 8 so that the tooth pattern 91 on the button body 9 separates from the fixing tooth slot 63 on the left half shaft 61, so that the angle of the pillow body 1 can be adjusted, making it more comfortable to use. Then release the button body 9, the compressed spring 8 will push the button body 9, and the tooth pattern 91 on the button body 9 snaps into the fixing tooth slot 63, thereby achieving the effect of a fixed angle.

Push the unlock handle 74 on the main plate 71 to be separated from the positioning hole in the left half shaft 61, and the distance between the shaft body 6 and the clamp body 7 can be adjusted by the extension and retraction of the coil spring 10 to so that the pillow body 1 can better fit the human body. Push the second unlock handle 75 on the main plate 71 and stretch the movable clamp arm 72 to a suitable position, thereby realizing the fixation to seats with different widths. In addition, with the hook 73, it is used for a person on rear seat to hang garbage bags or other items, which improves its functionality.

The following points that should be explained are mentioned herein. First of all, in the description of this application, it should be noted that, unless otherwise specified and defined, the terms "installation", "connection", and "coupling" should be understood in a broad sense, and they can be mechanical connections or electrical connection, it can also be the internal connection of two components, it can be directly connected. Furthermore, "up", "down", "left", "right", etc. are only used to indicate the relative positional relationship, when the absolute position of the object being described changes, the relative positional relationship may also change accordingly.

Secondly, in the drawings of the disclosed embodiments of the present disclosure, only the structures related to the embodiments of the present disclosure are set forth. Other structures can refer to the usual design. In the case where no conflict is present, the same embodiment and different embodiments of the present disclosure can be combined with each other.

Finally, the foregoing merely illustrates some exemplary embodiments of the present disclosure and is not used to limit the present disclosure. Any modifications, equivalent substitutions, improvements, etc. made within the spirit and principle of the disclosure shall all fall in the scope of protection of the disclosure.

What is claimed is:

1. An adjustable vehicle-mounted pillow device, comprising a pillow body, wherein a slideway cavity is disposed on one side of the pillow body, and a cover plate is disposed on an outer side of the slideway cavity, a fixing seat is movably connected in the slideway cavity, a connection head is clamped in the fixing seat, a shaft body is disposed on one side of the connection head, a first spring and a button body are disposed inside the shaft body, wherein the button body is disposed on one side of the first spring, and a clamp body is disposed on one side of the shaft body;

wherein a corrugated slideway is disposed on each of both sides in the slideway cavity;

wherein a clamping hole is opened in a middle of a top of the fixing seat, a slider is disposed on each of both sides of the fixing seat, and a second spring is connected to a bottom of each of both sliders;

wherein a snap buckle is disposed on an upper surface of the connection head;

wherein the shaft body comprises a left half shaft and a right half shaft, the left half shaft comprises a fixing tooth slot defined in the interior, and the right half shaft comprises a movable tooth slot defined in the interior; and wherein a tooth pattern is disposed on an outer surface of the button body.

2. The adjustable vehicle-mounted pillow device as recited in claim 1, wherein the sliders mesh with the respective corrugated slideways in the slideway cavity.

3. The adjustable vehicle-mounted pillow device as recited in claim 1, wherein the snap buckle on the connection head is matched and fitted with the clamping hole in the fixing seat.

4. The adjustable vehicle-mounted pillow device as recited in claim 1, wherein the fixing seat is connected to each of the sliders by a second spring, wherein the sliders are slidably connected with the fixing seat, and a protrusion is disposed on an upper surface of each of the sliders.

5. The adjustable vehicle-mounted pillow device as recited in claim 1, wherein the left half shaft and the right half shaft each comprise a round hole defined in the interior, and wherein the round holes are each slidably connected to the button body.

6. The adjustable vehicle-mounted pillow device as recited in claim 1, wherein a linkage shaft is arranged between the left half shaft and the right half shaft, wherein the left half shaft and the right half shaft are each fixedly connected with the connection head, and wherein a positioning hole is defined in a surface of a side portion of the left halt shaft.

7. The adjustable vehicle-mounted pillow device as recited in claim 1, wherein the tooth pattern on the button body meshes with each of the fixing tooth slot and the movable tooth slot.

8. The adjustable vehicle-mounted pillow device as recited in claim 1, wherein the clamp body comprises a main plate, a movable clamping arm is disposed on one side of the main plate, a fixed clamp arm is disposed on another side of the main plate, a hook is disposed on a side surface of the main plate, a first unlock handle is disposed on a side of an upper surface of the main plate, and a second unlock handle is disposed on another side of the upper surface of the main plate, wherein the main plate comprises two plates, comprising an upper plate and a lower plate, and wherein a coil spring is fixed inside the main plate.

9. The adjustable vehicle-mounted pillow device as recited in claim 8, wherein a return spring is disposed on a side surface of each of the first unlock handle and the second unlock handle.

10. The adjustable vehicle-mounted pillow device as recited in claim 1, wherein the pillow body comprises a mounting groove defined in the interior, and wherein the mounting groove is adapted to and fitted with the slideway cavity, wherein the slideway cavity is fixedly connected with the cover plate by bolts.

\* \* \* \* \*